(12) United States Patent
Farouz-Fouquet

(10) Patent No.: US 11,084,567 B2
(45) Date of Patent: Aug. 10, 2021

(54) AIRPLANE WITH CONFIGURATION CHANGING IN FLIGHT

(71) Applicant: Airbus Operations SAS, Toulouse (FR)

(72) Inventor: Mathias Farouz-Fouquet, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 339 days.

(21) Appl. No.: 16/209,353

(22) Filed: Dec. 4, 2018

(65) Prior Publication Data

US 2019/0168858 A1  Jun. 6, 2019

(30) Foreign Application Priority Data

Dec. 6, 2017  (FR) ...................................... 1761690

(51) Int. Cl.
| | | |
|---|---|---|
| *B64C 3/48* | (2006.01) | |
| *B64D 27/02* | (2006.01) | |
| *B64C 39/00* | (2006.01) | |
| *B64C 5/12* | (2006.01) | |

(52) U.S. Cl.
CPC ............... *B64C 3/48* (2013.01); *B64C 5/12* (2013.01); *B64C 39/008* (2013.01); *B64D 27/02* (2013.01)

(58) Field of Classification Search
CPC .......... B64C 39/008; B64C 3/48; B64C 3/56; B64C 5/12; B64C 23/72; B64C 23/76; B64C 5/10; B64C 17/02; B64C 5/02; B64C 5/18; B64D 27/02; B64D 27/26; B64D 27/00; B64D 27/08; B64D 2009/006; B64D 9/00; B65G 67/00
See application file for complete search history.

(56) References Cited

U.S. PATENT DOCUMENTS

| | | | | | |
|---|---|---|---|---|---|
| 2,166,564 | A | * | 7/1939 | Pavlecka | .................... B64C 3/56 244/49 |
| 2,257,940 | A | * | 10/1941 | Dornier | .................... B64C 11/00 244/53 R |
| 2,290,850 | A | * | 7/1942 | Umschweif | ............... B64C 3/56 244/49 |
| 2,650,050 | A | * | 8/1953 | Chandler | ............... B64D 27/26 248/554 |

(Continued)

FOREIGN PATENT DOCUMENTS

| | | |
|---|---|---|
| EP | 2030892 A1 | 3/2009 |
| WO | 2016046787 A1 | 3/2016 |

OTHER PUBLICATIONS

French Search Report; priority document.

*Primary Examiner* — Medhat Badawi
(74) *Attorney, Agent, or Firm* — Greer, Burns & Crain, Ltd.

(57) ABSTRACT

An airplane comprising a fuselage, two wings, a rear tail unit comprising a horizontal tail provided with two tail ends, and at least two engines arranged on the fuselage on either side of a vertical plane of symmetry of the airplane, the airplane having a longitudinal axis, the engines being mounted so as to be able to be displaced, at least in flight, on the fuselage, substantially parallel to the longitudinal axis, and the tail ends being mounted so as to be able to be pivoted, at least in flight, relative to the horizontal tail, the airplane thus having a configuration that changes in flight.

10 Claims, 4 Drawing Sheets

(56) References Cited

U.S. PATENT DOCUMENTS

| | | | | |
|---|---|---|---|---|
| 3,327,965 | A * | 6/1967 | Bockrath | B64D 27/18 244/54 |
| 3,735,946 | A * | 5/1973 | Mullins | B64D 27/16 244/54 |
| 4,482,108 | A * | 11/1984 | Sutton | B64C 29/0083 244/12.4 |
| 4,691,880 | A * | 9/1987 | Frank | F42B 10/16 244/49 |
| 4,717,093 | A * | 1/1988 | Rosenberger | F42B 10/16 244/49 |
| 5,201,479 | A * | 4/1993 | Renzelmann | B64C 3/56 244/49 |
| 5,381,986 | A * | 1/1995 | Smith | B64C 3/56 244/49 |
| 5,645,249 | A * | 7/1997 | Hein | B64C 3/56 244/17.11 |
| 5,988,563 | A * | 11/1999 | Allen | B64C 3/56 244/49 |
| 6,260,799 | B1 * | 7/2001 | Russ | B64C 3/56 244/49 |
| 7,275,722 | B2 * | 10/2007 | Irving | B64C 23/072 244/201 |
| 7,744,038 | B2 * | 6/2010 | Sankrithi | B64C 23/076 244/199.4 |
| 9,567,090 | B2 * | 2/2017 | Gallet | B64D 27/26 |
| 10,137,977 | B2 * | 11/2018 | Thompson | B64C 23/072 |
| 10,293,917 | B2 * | 5/2019 | Niemiec | B64D 45/0005 |
| 10,301,030 | B2 * | 5/2019 | Castelli | B64C 15/12 |
| 2008/0308683 | A1 * | 12/2008 | Sankrithi | B64C 23/076 244/199.4 |
| 2009/0072079 | A1 * | 3/2009 | Hawley | B64D 29/04 244/54 |
| 2009/0084893 | A1 * | 4/2009 | Balk | B64D 27/26 244/54 |
| 2009/0302151 | A1 * | 12/2009 | Holmes | B64C 3/56 244/49 |
| 2010/0001121 | A1 * | 1/2010 | Verde Preckler | B64C 15/12 244/12.5 |
| 2010/0019081 | A1 * | 1/2010 | Cazals | B64D 27/20 244/56 |
| 2011/0036941 | A1 * | 2/2011 | Cazals | B64C 5/06 244/46 |
| 2011/0192933 | A1 * | 8/2011 | Guering | B64D 27/26 244/54 |
| 2011/0259996 | A1 * | 10/2011 | Vetters | B64D 27/26 244/54 |
| 2012/0292436 | A1 * | 11/2012 | Karem | B64C 3/56 244/49 |
| 2013/0327883 | A1 * | 12/2013 | Kordel | B64C 23/072 244/49 |
| 2013/0341467 | A1 * | 12/2013 | Sakurai | B64C 3/56 244/201 |
| 2014/0117150 | A1 * | 5/2014 | Good | B64C 3/56 244/49 |
| 2014/0117151 | A1 * | 5/2014 | Fox | B64C 23/072 244/49 |
| 2015/0097087 | A1 * | 4/2015 | Sakurai | B64C 3/40 244/201 |
| 2016/0167092 | A1 * | 6/2016 | Gaw | B64C 3/56 244/201 |
| 2017/0137110 | A1 * | 5/2017 | Harding | B64C 13/28 |
| 2017/0137111 | A1 * | 5/2017 | Harding | B64C 3/56 |
| 2017/0305525 | A1 * | 10/2017 | Xi | B64C 3/385 |
| 2017/0355438 | A1 * | 12/2017 | Bishop | B64C 3/56 |
| 2017/0355440 | A1 * | 12/2017 | Bishop | B64C 3/56 |
| 2019/0084673 | A1 * | 3/2019 | Chen | B64C 3/56 |
| 2019/0168858 | A1 * | 6/2019 | Farouz-Fouquet | B64D 27/02 |

* cited by examiner

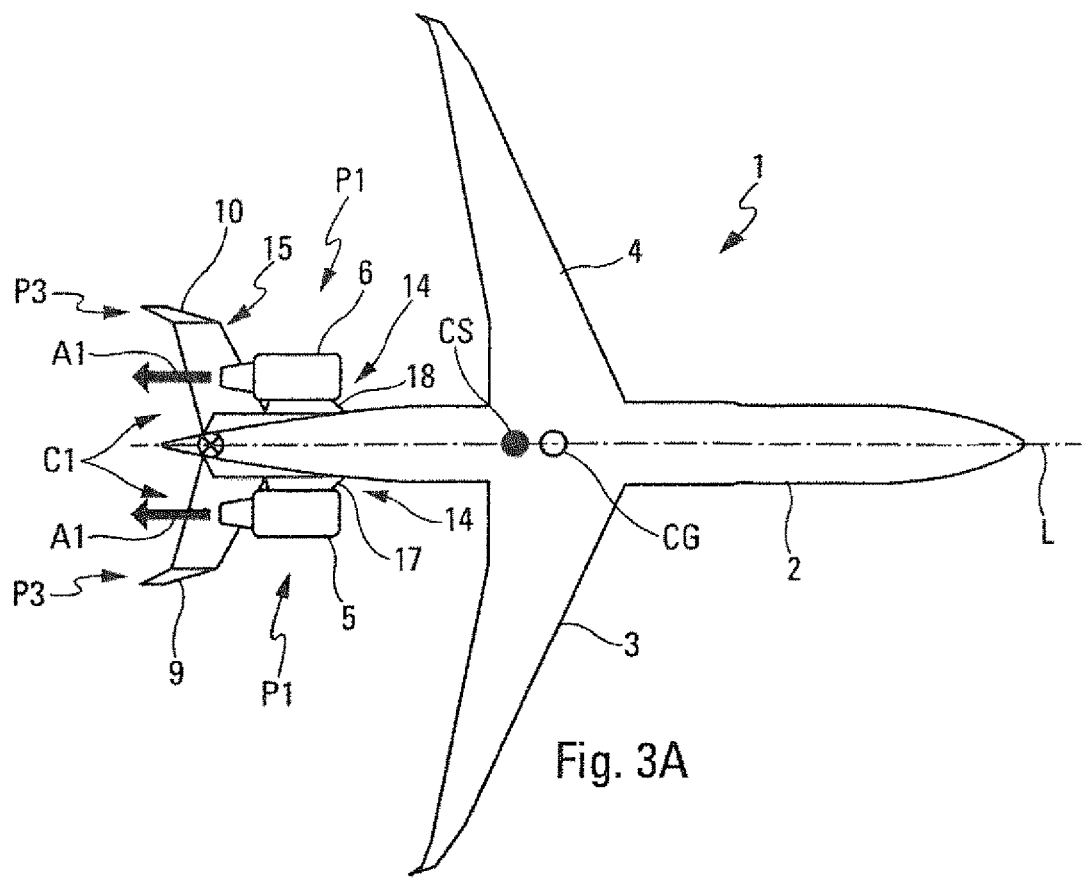
Fig. 3A
Fig. 3B
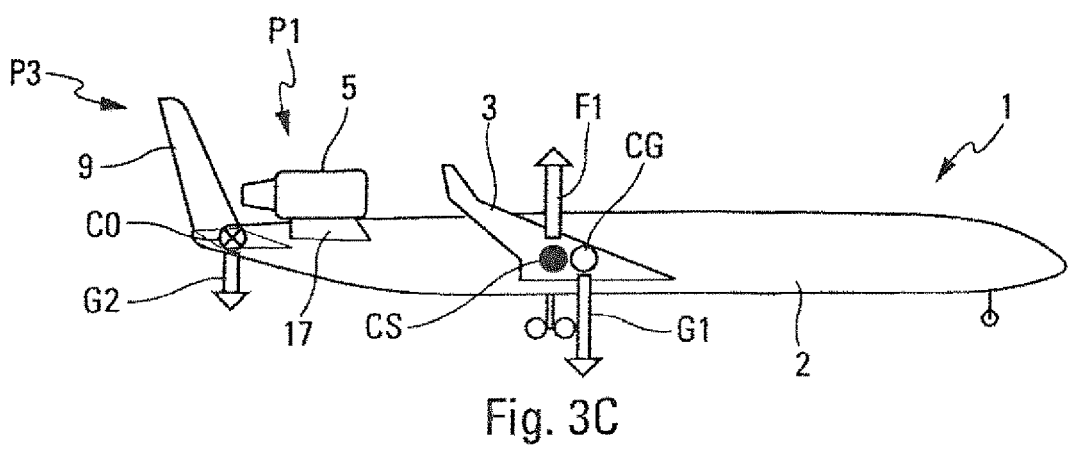
Fig. 3C

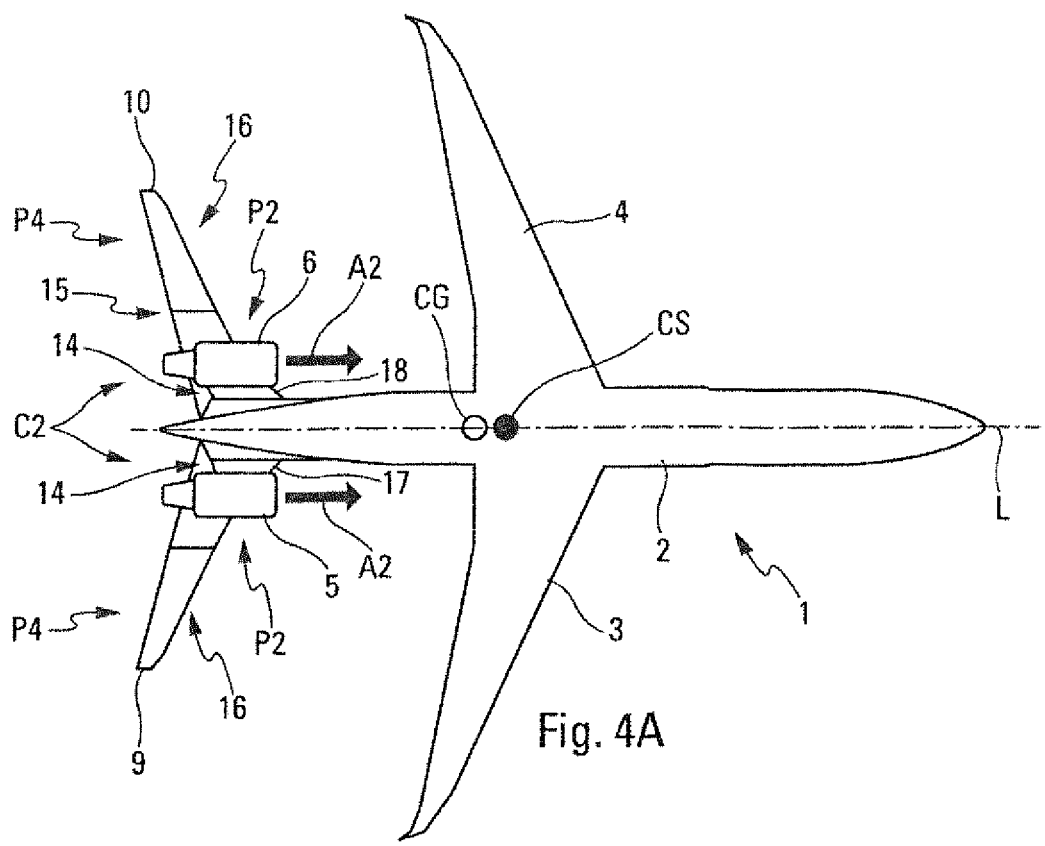
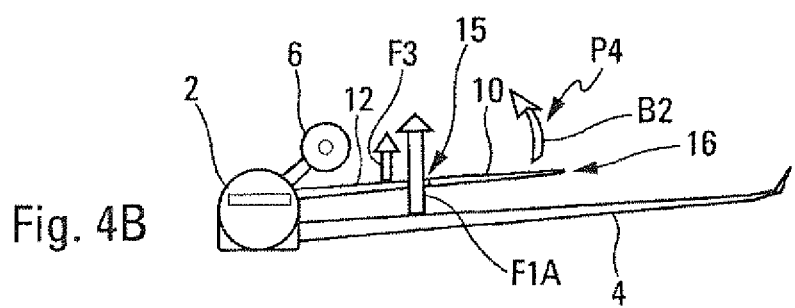
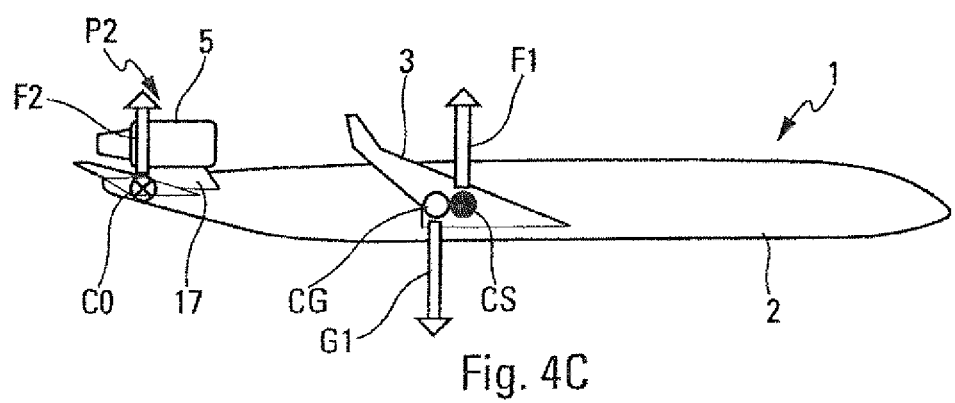

AIRPLANE WITH CONFIGURATION CHANGING IN FLIGHT

CROSS-REFERENCES TO RELATED APPLICATIONS

This application claims the benefit of the French patent application No. 1761690 filed on Dec. 6, 2017, the entire disclosures of which are incorporated herein by way of reference.

BACKGROUND OF THE INVENTION

The present invention relates to an airplane with aerodynamic configuration changing in flight.

The present invention applies to an airplane, in particular a transport airplane, which comprises, in particular, a fuselage, two wings, at least two engines arranged on either side of a vertical plane of symmetry of the airplane, and horizontal and vertical rear tails implementing the usual functions of stability and of control of the attitude and of the trajectory of the airplane.

It is known that, in general, the horizontal tail of an airplane comprises a fixed part and a mobile part representing an elevator, and the vertical tail comprises a fixed part and a mobile part representing a rudder.

Such a standard architecture of an airplane with rear (horizontal and vertical) tails, presents drawbacks. In particular:

when the airplane is in cruising flight, the rear vertical tail contributes little to the aerodynamics of the airplane and adds weight and drag for no aerodynamic, economic or safety advantage. This rear vertical tail is used, primarily, during the take-off and landing phases, when rapid changes in direction can occur. It is also very important when an engine undergoes shut down during take-off. The rudder is then activated by the pilot to act against the thrust imbalance. Consequently, the rear vertical tail is used only for short periods of time during the flight, although it represents a significant surface area, generally of the order of 10% of the wing surface area; and the purpose of the rear horizontal tail is to counteract both the natural pitch moment of the wings, and the position of the center of gravity located forward of the center of lift of the wings. The rear horizontal plane exerts a downward force to keep the airplane stable and in balance during a flight. This results in a loss of efficiency, both aerodynamic and economic. The rear horizontal tail does not participate in the lift of the airplane. On the contrary, it degrades it by approximately 5%, while representing 15% to 20% of the wing surface area.

The configuration of such an airplane, which is fixed, is not therefore optimal in all the flight phases.

In the context of the present invention, the configuration of the airplane depends, in particular, on the characteristics of the rear tail unit and on the position of the center of gravity of the airplane.

SUMMARY OF THE INVENTION

An object of the present invention is to remedy this drawback. To do this, it relates to an airplane, in particular a transport airplane, which comprises at least a fuselage, two wings, a rear tail unit comprising a horizontal tail provided with two tail ends, and at least two engines arranged on the fuselage on either side of a vertical plane of symmetry of the airplane, the airplane having a longitudinal axis.

According to the invention, the engines are mounted so as to be able to be displaced, at least in flight, on the fuselage, substantially parallel to the longitudinal axis, and the tail ends are mounted so as to be able to be pivoted, at least in flight, relative to the horizontal tail.

Thus, by virtue of the capacity both to displace the engines of the airplane and to pivot the tail ends, during a flight, there is a possibility of changing the configuration of the airplane in flight. As specified below, this makes it possible, in particular, to adapt the configuration of the airplane to the current flight phase, in order to exploit the various elements of the rear tail unit (and do so in differentiated ways) during the various flight phases.

Advantageously, the airplane having a center of gravity and a center of lift (of the wings), comprises at least one displacement mechanism capable of being controlled and configured to be able to bring each of the engines, at least in flight, alternately into one or other of the following two stable positions, on the fuselage:

a so-called forward position, in which the center of gravity of the airplane is situated towards the front of the airplane relative to its center of lift; and a so-called aft position, positioned towards the rear of the airplane relative to the forward position and in which the center of gravity of the airplane is situated towards the rear of the airplane relative to its center of lift.

Furthermore, advantageously, the airplane also comprises at least one pivoting mechanism capable of being controlled and configured to be able to bring each of the two tail ends, at least in flight, alternately into one or other of the following two stable positions:

a first, so-called folded position, in which the two tail ends are arranged substantially orthogonally to a general plane of the horizontal tail so as to form a vertical tail; and a second, so-called deployed position, in which the two tail ends are arranged substantially in the general plane of the horizontal tail so as to be able to form, with the horizontal tail, an augmented horizontal tail surface.

In the context of the present invention, the displacement and pivoting mechanisms can be produced in different ways. Advantageously, the displacement mechanism can comprise a sliding system or an articulation system.

Moreover, advantageously, the airplane further comprises mobile control surfaces configured to act on the yaw of the airplane.

The present invention applies equally to airplanes whose engines are turbojet engines or turboprop engines, and to airplanes whose engines are propfan or open rotor engines.

The present invention relates also to a method for modifying a configuration of an airplane in flight, the airplane comprising at least a fuselage, two wings, a rear tail unit comprising a horizontal tail provided with two tail ends, and at least two engines arranged on the fuselage on either side of a vertical plane of symmetry of the airplane, the engines being mounted so as to able to be displaced on the fuselage, substantially parallel to a longitudinal axis of the airplane, and the tail ends being mounted so as to be able to be pivoted relative to the horizontal tail.

According to the invention, the method for modifying the configuration of the airplane comprises:

at least a first step comprising bringing the engines into a so-called forward position and bringing the tail ends into a so-called folded position in which the tail ends are arranged substantially orthogonally to a general plane of the horizontal tail; and at least a second step comprising bringing the engines into a so-called aft position displaced towards the rear of the airplane relative to the forward position and in bringing the tail ends into a so-called deployed position in which the tail ends are arranged substantially in the general plane of the horizontal tail, the first and second steps being implemented at least during a flight of the airplane.

Advantageously, the first step is implemented, at least, during a take-off phase of the airplane and/or during a landing phase of the airplane, and the second step is implemented, at least, during a cruising flight phase of the airplane.

Thus:

during the take-off and landing phases, the configuration of the airplane is conventional, with the tail ends arranged vertically at the ends of the horizontal tail. Furthermore, since the engines are brought into the forward position, the center of gravity of the airplane is situated forward of the center of lift, and the (rear) horizontal tail exerts a downward force to keep all of the airplane in balance;

during the cruising flight phase or phases, the engines are displaced towards the rear, in the aft position, which causes a displacement to the rear of the center of gravity, which is then to the rear of the main center of lift of the airplane. The horizontal tail and the tail ends become a lift surface and participate in the lift of the airplane. The yaw stability, which is not as critical during the cruising phase as during the take-off and landing phase, is also ensured by the rearward displacement of the engines.

BRIEF DESCRIPTION OF THE DRAWINGS

The attached figures will give a clear understanding as to how the invention can be produced. In these figures, identical references denote similar elements. More particularly:

FIGS. 3A, 3B and 3C schematically illustrate plan views of the airplane that is in the configuration of FIG. 1, respectively by top view, by partial front view, and by side view;

FIGS. 4A, 4B and 4C schematically illustrate plan view of the airplane that is in the configuration of FIG. 2, respectively by view from above, by partial front view, and by lateral view;

DETAILED DESCRIPTION OF THE PREFERRED EMBODIMENTS

Figure 1:
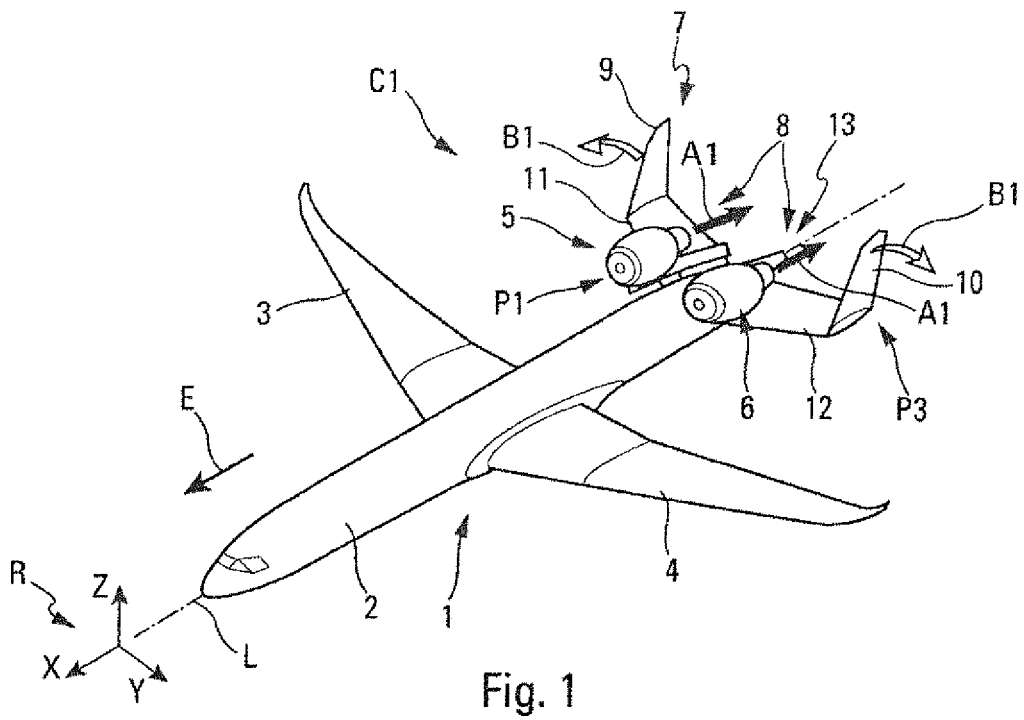
FIG. 1 is a perspective schematic view of an airplane provided with faired engines, in a first configuration.
Figure 2:
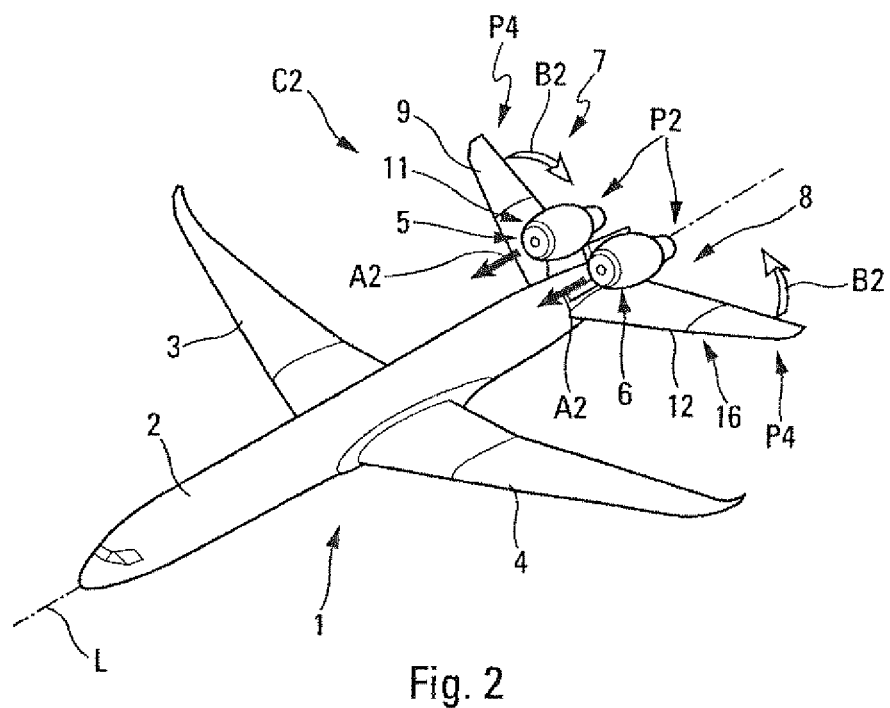
FIG. 2 is a perspective schematic view of an airplane provided with faired engines, in a second configuration.

FIGS. 1 and 2 show an airplane 1, for example a transport airplane, having a longitudinal axis L, which is represented schematically in a particular embodiment.

To facilitate the description, FIG. 1 shows a standard airplane reference frame R, comprising three main directions, namely:

a so-called longitudinal direction X, parallel to the longitudinal axis L of the airplane 1;

a so-called vertical direction Z, at right angles to the longitudinal direction X, the plane XZ forming a vertical plane of symmetry of the airplane 1; and a so-called lateral direction Y, at right angles to the plane XZ.

FIG. 1 also shows a direction E of flight of the airplane 1. In the following description, the terms "forward" and "aft" are defined relative to the direction E (that is to say towards the front or towards the rear of the airplane 1). Similarly, the terms "up" and "down" are defined relative to the direction illustrated by the arrow Z (that is to say upwards of or downwards of the airplane 1).

This airplane 1 comprises, as represented in particular in FIG. 1:

an elongate fuselage 2, of longitudinal axis corresponding to the longitudinal axis L;

two wings 3 and 4 fixed on either side of the fuselage 2;

two engines 5 and 6 arranged on the fuselage 2 on either side of the vertical plane of symmetry XZ of the airplane 1. Engine 5, 6, is always understood to mean the assembly formed by the engine members and an associated nacelle if appropriate; and a rear tail unit 7 comprising a horizontal tail 8 provided with two tail ends 9 and 10.

In the example represented in FIG. 1, the horizontal tail 8 is formed by two tail parts 11 and 12, of generally substantially planar form, which are fixed on either side of the fuselage 2 in proximity to the tail 13 of the airplane 1. The tail ends 9 and 10 are arranged, respectively, at the free ends of the tail parts 11 and 12. The tail ends 9 and 10 represent surfaces of generally substantially planar form. The tail parts 11 and 12 and the tail ends 9 and 10 can be provided with standard control surfaces (not represented).

Furthermore, the engines 5 and 6 are arranged on the fuselage at the rear tail unit 7, as specified hereinbelow.

According to the invention, and as specified hereinbelow:

the engines 5 and 6 are mounted on the fuselage 2 so as to be able to be displaced, at least during a flight of the airplane 1, substantially parallel to the longitudinal axis L; and the tail ends 9 and 10 are mounted so as to be able to be pivoted, also at least during a flight of the airplane 1, relative to the tail parts 11 and 12 of the horizontal tail 8.

The airplane 1 also comprises a displacement mechanism 14 (FIGS. 3A and 4A). This displacement mechanism 14 is capable of being controlled, for example by a command received from a pilot of the airplane or by a command received from an automatic piloting system of the airplane.

The displacement mechanism 14 is configured to be able to bring, on the fuselage 2, both of the engines 5 and 6, during a flight of the airplane 1 and also on the ground, alternately into one or other of the two stable positions P1 and P2.

The so-called forward position P1 is such that the center of gravity CG of the airplane 1 is situated towards the front of the airplane 1 relative to the center of lift CS (representing the point of application of the lift generated by the wings 3 and 4), as represented in FIGS. 3A and 3C. In FIG. 3A, there is an arrow F1 illustrating the lift generated by the wings 3 and 4 of the airplane 1, which is directed from the center of lift CS of the airplane 1 upwards. Also shown in this FIG. 3C is an arrow G1 illustrating the weight generated by the mass of the airplane 1, which is directed from the center of gravity CG of the airplane 1 downwards.

As for the so-called aft position P2 of the engines 5 and 6, it is positioned towards the rear of the airplane 1 relative to the forward position P1, in the direction illustrated by the arrows A1 in FIG. 1. In this position P2, the center of gravity CG of the airplane 1 is situated towards the rear of the airplane 1 relative to the center of lift CS, as represented in FIGS. 4A and 4C.

Moreover, the airplane 1 also comprises a pivoting mechanism 15 (FIGS. 3A, 4A and 4B). This pivoting mechanism 15 is capable of being controlled, for example by a command received from a pilot of the airplane or by a command received from an automatic piloting system of the airplane.

The pivoting mechanism 15 is configured to be able to bring both of the two tail ends 9 and 10, during a flight of the airplane 1 and also on the ground, alternately into one or other of the two stable positions P3 and P4.

The so-called folded position P3 is such that the two tail ends 9 and 10 are arranged substantially orthogonally to a general plane formed by the horizontal tail 8 (or its two tail parts 11 and 12), as represented in FIG. 1 and FIGS. 3A to 3C. This general plane can be substantially parallel to a plane XY. In this folded position P3, the two tail ends 9 and 10, of generally planar form, are substantially parallel to the plane XZ. In this folded position P3, the two tail ends 9 and 10 thus form, together, a rear vertical tail and they are capable of fulfilling the standard functions of a vertical tail of an airplane. In this folded position P3, the rear tail unit 7 therefore comprises a horizontal tail 8 and a vertical tail formed by the tail ends 9 and 10.

Furthermore, the so-called deployed position P4 is such that the two tail ends 9 and 10 are arranged substantially in the general plane formed by the horizontal tail 8 (or its two unit parts 11 and 12), as represented in FIG. 2 and FIGS. 4A to 4C. In this deployed position P3, the two tail ends 9 and 10 form, with the horizontal tail 8, an augmented horizontal tail surface 16. By virtue of this augmented horizontal tail surface 16, the airplane 1 has a global surface that is greater and therefore more efficient for implementing the standard functions of a horizontal airplane tail and above all for participating in the lift, as specified hereinbelow.

In the example of FIGS. 1 and 3A to 3C, the airplane 1 is in a first configuration C1, in which the engines 5 and 6 are in the forward position P1 and the tail ends 9 and 10 are in the folded position P3.

This configuration C1 of the airplane, which is conventional, is used preferably during the take-off and landing phases of the airplane 1, as specified hereinbelow. The center of gravity CG is situated forward of the center of lift CS, and the horizontal tail 8 exerts a downward force, as illustrated by an arrow G2 in FIG. 3C from a point of application C0 situated at the tail 13 of the airplane 1 (or as shown by the arrow G3 for the tail part 12 in FIG. 3B) to keep all of the airplane 1 in balance. The balance is obtained by the combination of the different forces illustrated by the arrows G1, G2 and F1. The arrow F1A in FIG. 3B shows the lift generated by the wing 4.

Moreover, in the example of FIGS. 2 and 4A to 4C, the airplane 1 is in a second configuration C2, in which the engines 5 and 6 are in the aft position P2 and the tail ends 9 and 10 are in the deployed position P4.

This configuration C2 of the airplane 1 is used, preferably, during a cruising flight. The engines 5 and 6 are displaced towards the rear, which results in a displacement towards the rear of the center of gravity CG, which is then to the rear of the center of lift CS. The yaw stability, which is not as critical during the cruising phases as in the take-off and landing phases, is also ensured by the rearward displacement of the engines 5 and 6.

The airplane can, furthermore, comprise mobile control surfaces (not represented) arranged on the wings 3 and 4 and/or on the rear tail unit 7, to automatically perform an additional yaw correction.

In this configuration C2, the center of gravity CG is situated to the rear of the center of lift CS, and the horizontal tail 8 exerts an upward force, as illustrated by an arrow F2 in FIG. 4C from the point of application C0 situated at the tail 13 of the airplane 1 (or, as shown by the arrow F3 for the tail part 12 in FIG. 4B) to provide an additional lift, and does so using an enlarged surface (namely the enlarged horizontal tail surface 16).

In the context of the present invention, the displacement mechanism 14 and the pivoting mechanism 15 can be produced in different ways, making it possible to implement the displacement and pivoting functions.

Each of the engines 5 and 6 is arranged on the fuselage 2 of the airplane 1 via an associated strut 17, 18, as represented in FIGS. 3A and 4A, in particular. In a preferred embodiment, the displacement mechanism 14 is configured to act on the struts 17 and 18.

Figure 5A:
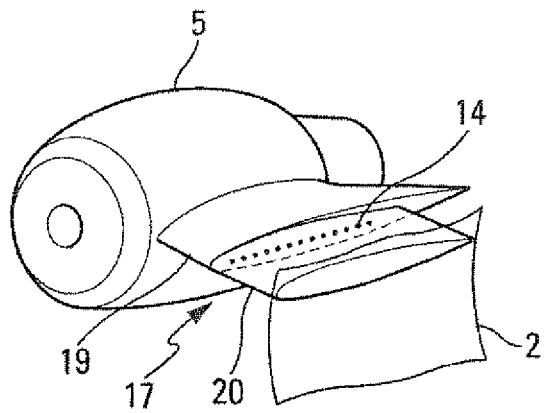
FIGS. 5A and 5B schematically illustrate, in perspective, an engine provided with a displacement mechanism, with the engine, respectively, in a forward position and in an aft position.
Figure 5B:
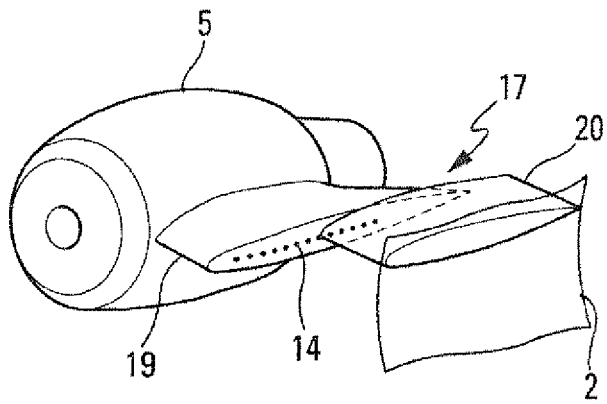

In the example represented schematically in FIGS. 5A and 5B, the strut 17 is formed by two parts 19 and 20, of which one 19 is fixed to the engine 5 and of which the other 20 is fixed to the fuselage 2 of the airplane 1.

In this example, the displacement mechanism 14 is incorporated in the strut 17 between the two parts 19 and 20 and makes it possible to generate a displacement of one relative to the other and therefore of the engine 5 relative to the fuselage 2 between an aft position (FIG. 5A) and a forward position (FIG. 5B) of the strut 17 and of the engine 6 with which it is associated.

Figure 6:
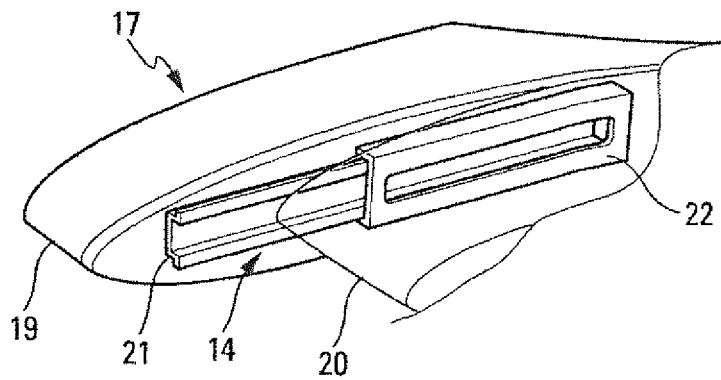
FIG. 6 is a perspective schematic view which shows an example of displacement mechanism.

As an illustration, the displacement mechanism 14 can comprise a sliding system 20, as represented schematically in FIGS. 5A, 5B and 6. In this example, the sliding system 20 comprises a rail 21 fixed onto the part 19 and a guide 22 fixed onto the part 20, which is capable of sliding on this rail 21.

In a variant embodiment (not represented), the displacement mechanism can also comprise an articulation system.

Figure 7:
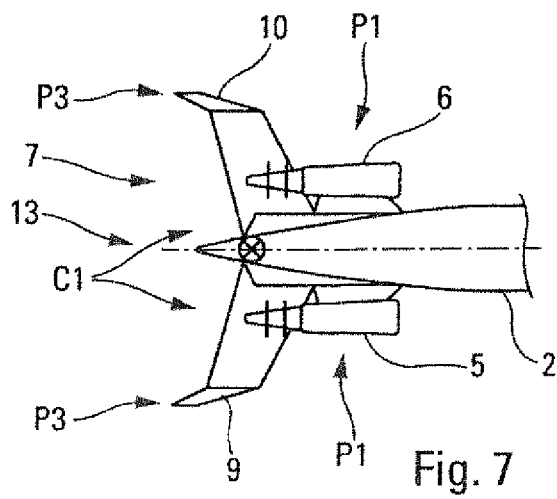
FIG. 7 shows the tail of the airplane provided with a propfan engine.

The present invention applies equally to an airplane whose engines 5 and 6 are turbojet engines or turboprop engines, as represented in the examples of FIGS. 1 to 4C, and to an airplane whose engines 5 and 6 are propfan or open rotor engines, with a simple propulsion or a contra-rotational propulsion on each strut/engine assembly, as shown schematically by way of illustration in FIG. 7 which represents the tail 13 of an airplane 1 in a view similar to that of the tail of the airplane of FIG. 3A.

The present invention relates also to a method for modifying the configuration of an airplane 1 such as that described above.

Figure 8:
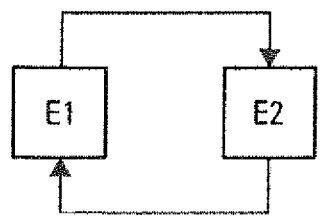
FIG. 8 is the block diagram of a method for modifying the configuration of an airplane.

This method comprises, as represented in FIG. 8:
a step E1 comprising bringing the airplane 1 into the configuration C1 (FIGS. 1 and 3A to 3C). To do this, this step E1 comprises:
on the one hand, in bringing the engines 5 and 6 into the forward position P1 represented in FIGS. 1 and 3A to 3C, using the displacement mechanism 14, and doing so from the aft position P2 represented in FIGS. 2 and 4A to 4C, in the direction illustrated by the arrows A2 in FIGS. 2 and 4A; and on the other hand, in bringing the tail ends 9 and 10 into the folded position P3 represented in FIGS. 1 and 3A to 3C, using the pivoting mechanism 15, from the deployed position P4 represented in FIGS. 2 and 4A to 4C, in the direction illustrated by the arrows B2 in FIGS. 2 and 4B;

a step E2 comprising bringing the airplane 1 into the configuration C2 (FIGS. 2 and 4A to 4C). To do this, this step E2 comprises:

on the one hand, in bringing the engines 5 and 6 into the aft position P2 represented in FIGS. 2 and 4A to 4C, using the displacement mechanism 14, and doing so from the forward position P1 represented in FIGS. 1 and 3A to 3C, in the direction illustrated by the arrows A1 in FIGS. 1 and 3A; and on the other hand, in bringing the tail ends 9 and 10 into the deployed position P4 represented in FIGS. 2 and 4A to 4C, using the pivoting mechanism 15, from the folded position P3 represented in FIGS. 1 and 3A to 3C, in the direction illustrated by the arrows B1 in FIGS. 1 and 3B.

The steps E1 and E2 are implemented, alternately, during a flight of the airplane 1. The transition from one to the other of these steps E1 and E2, to change the configuration of the airplane 1, can be controlled and performed several times during one and the same flight. The configuration modification control (or control of activation of one or other of the steps E1 and E2), can be generated by a pilot of the airplane or by an automatic piloting system of the airplane.

The step E1 is implemented, at least, during a take-off phase of the airplane and/or during a landing phase of the airplane, and the step E1 is implemented, at least, during a cruising flight phase of the airplane.

By changing the configuration of the airplane and the position of the center of gravity during the flight, it is thus possible to augment the aerodynamic efficiency of the airplane 1, and to reduce the fuel consumption. Furthermore, the airplane 1, as described above, is able, when it is in the configuration C2, to fly at a higher altitude than the usual maximum cruising flight altitudes.

The airplane 1, as described above, offers many other advantages.

In particular, through the capacity to pivot the tail parts 9 and 10:

the lift surface of the airplane 1 can be augmented, for example by approximately 10%, with a low mass penalty due to the displacement and pivoting systems 14 and 15;

a reduction of fuel consumption is obtained. In cruising flight, the rear tail unit 7 in fact generates, using the tail plane parts 11 and 12 and the tail ends 9 and 10, a lift force, and the airplane can fly at a higher altitude;

the surface augmentation through the deployment of the tail parts 9 and 10, makes it possible to fly at a higher altitude, without increasing power and without increasing the surface of the main wing formed by the wings 3 and 4 (and therefore without increasing mass);

the tail parts 9 and 10 (forming, in folded position, a rear vertical tail) become a lift surface when they are deployed during the cruising flight phase;

the complete rear horizontal plane 7 becoming a lift surface and not a surface applying a downward force can be a laminar surface.

The airplane 1, as described above, also offers the following advantages:

the rearward displacement of the engines increases their distance relative to the cabin of the airplane, and thus reduces the noise in the cabin;

during the take-off and approach phases, the tail ends 9 and 10 in vertical position act as anti-noise shields for the noise generated by the outlets of the engines 5 and 6;

for the engines of "open rotor" type, the rearward displacement of the engines for the cruising flight significantly reduces the vibrations and the fatigue generated;

if, during a cruising flight, a blade were to be detached from the fan of an engine or from the propeller of an engine, it would not have impact on vital zones of the fuselage, which makes it possible to increase the overall safety of the airplane.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An airplane comprising:
a fuselage having a longitudinal axis,
two wings,
a rear tail unit comprising a horizontal tail provided with two tail ends, and
at least two engines arranged on the fuselage on either side of a vertical plane of symmetry of the airplane,
said engines are displaceably mounted, at least in flight, on said fuselage, substantially parallel to the longitudinal axis, and
said tail ends are pivotably mounted, at least in flight, relative to said horizontal tail,
wherein said engines are displaceable into a forward position, and said two tail ends are pivotable to a folded position in which said two tail ends are arranged substantially orthogonally to a plane formed by the horizontal tail, and
wherein said engines are displaceable into an aft position towards a rear of the airplane relative to said forward position, and said two tail ends are pivotable into a deployed position in which said two tail ends are arranged substantially in the plane formed by said horizontal tail.

2. The airplane according to claim 1, said airplane further having a center of gravity and a center of lift, and comprising at least one controllable displacement mechanism configured to bring each of said engines, at least in flight, alternately into one or another of two stable positions on the fuselage:

the forward position, in which the center of gravity of the airplane is situated towards the front of the airplane relative to the center of lift; and the aft position, positioned towards the rear of the airplane relative to said forward position and in which the center of gravity of the airplane is situated towards the rear of the airplane relative to the center of lift.

3. The airplane according to claim 1, further comprising at least one controllable pivoting mechanism configured to bring each of the two tail ends, at least in flight, alternately into one or another of two stable positions:

the folded position, in which the two tail ends are arranged substantially orthogonally to the plane formed by said horizontal tail so as to form a vertical tail; and the deployed position, in which the two tail ends are arranged substantially in the plane formed by said horizontal tail so as to form, with the horizontal tail, an augmented horizontal tail surface.

4. The airplane according to claim 2, wherein the displacement mechanism comprises a sliding system.

5. The airplane according to claim 2, wherein the displacement mechanism comprises an articulation system.

6. The airplane according to claim 1, further comprising mobile control surfaces configured to act on a yaw of the airplane.

7. The airplane according to claim 1, wherein the engines are jet engines or turboprop engines.

8. The airplane according to claim 1, wherein said engines are propfan or open rotor engines.

9. A method for modifying a configuration of an airplane in flight, said airplane comprising a fuselage, two wings, a rear tail unit comprising a horizontal tail provided with two tail ends, and at least two engines arranged on the fuselage on either side of a vertical plane of symmetry of the airplane, said engines are displaceably mounted on said fuselage, substantially parallel to a longitudinal axis of the airplane, and said tail ends are pivotably mounted relative to said horizontal tail, the method comprising:

a first step comprising bringing said engines into a forward position and in bringing said tail ends into a folded position in which said tail ends are arranged substantially orthogonally to a plane formed by said horizontal tail; and a second step comprising bringing said engines into an aft position, displaced towards the rear of the airplane relative to said forward position and in bringing said tail ends into a deployed position in which said tail ends are arranged substantially in the plane formed by said horizontal tail, said first and second steps are implemented alternately at least during a flight of the airplane.

10. The method according to claim 9, wherein said first step is implemented, at least, during at least one of a take-off phase of the airplane or during a landing phase of the airplane, and wherein said second step is implemented, at least, during a cruising flight phase of the airplane.

* * * * *